No. 825,586. PATENTED JULY 10, 1906.
C. COMSTOCK.
LUBRICATOR.
APPLICATION FILED AUG. 5, 1905.

2 SHEETS—SHEET 1.

Witnesses:

Inventor
Chester Comstock:
By his attorney
J. H. Richards

THE NORRIS PETERS CO., WASHINGTON, D. C.

No. 825,586. PATENTED JULY 10, 1906.
C. COMSTOCK.
LUBRICATOR.
APPLICATION FILED AUG. 5, 1905.
2 SHEETS—SHEET 2.
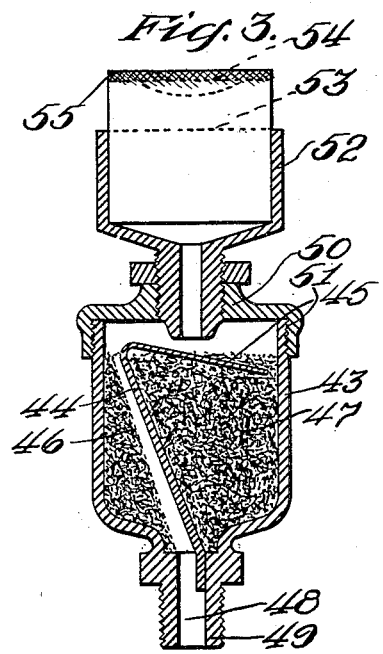
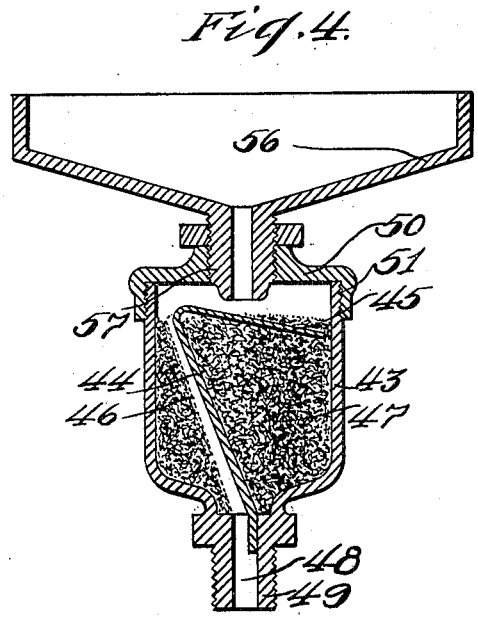
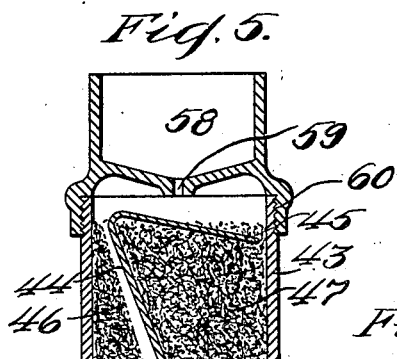
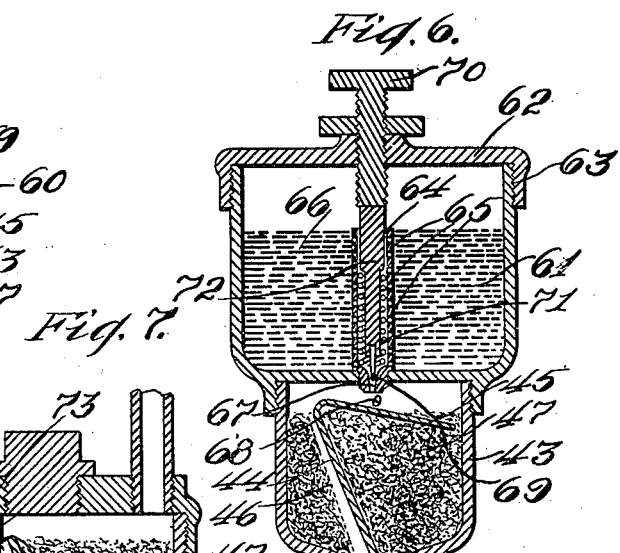
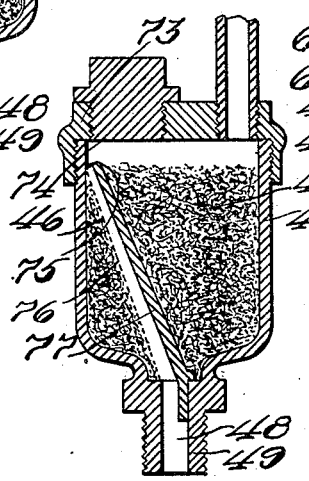
Witnesses:
Inventor:
Chester Comstock;
By his Attorney,

UNITED STATES PATENT OFFICE.

CHESTER COMSTOCK, OF BROOKLYN, NEW YORK.

LUBRICATOR.

No. 825,586. Specification of Letters Patent. Patented July 10, 1906.

Application filed August 5, 1905. Serial No. 272,810.

*To all whom it may concern:*

Be it known that I, CHESTER COMSTOCK, a citizen of the United States, residing in the borough of Brooklyn, in the county of Kings and State of New York, have invented certain new and useful Improvements in Lubricators, of which the following is a specification.

This invention relates to the class of lubricators such as patented to me on January 24, 1905, numbered 780,778 and 780,779, wherein a fluid, such as oil, is deposited on top of a non-fluid mass, such as graphite or soap, and after moving over such surface the fluid penetrates a finely-perforated wall, such as a wire-gauze fine enough to prevent penetration by the mass of graphite, the fluid thereby becoming admixed with the graphite by the adhesion thereto and which mixture passes through the wire-gauze and by suitable conduit is conveyed to the parts to be lubricated. In one of said patents the wire-gauze member was constructed in the form of a lining or inner vessel, in which the graphite or other non-fluid substance is placed, the oil passing through the gauze escaping between the gauze lining and the inner wall of the receptacle.

It is an object of the present invention to provide a gauze member in the nature of a conduit, whereby the oil admixed with graphite upon penetrating the gauze would pass down this conduit through the body of the mass of graphite to a suitable outlet and conveyed to the place to be used by suitable means.

A further object of the invention is to provide the said conduit member with an arm at its upper end extending across and above the surface of the graphite for receiving and deflecting the oil or other liquid to be deposited on the surface of the graphite.

Figure 1:
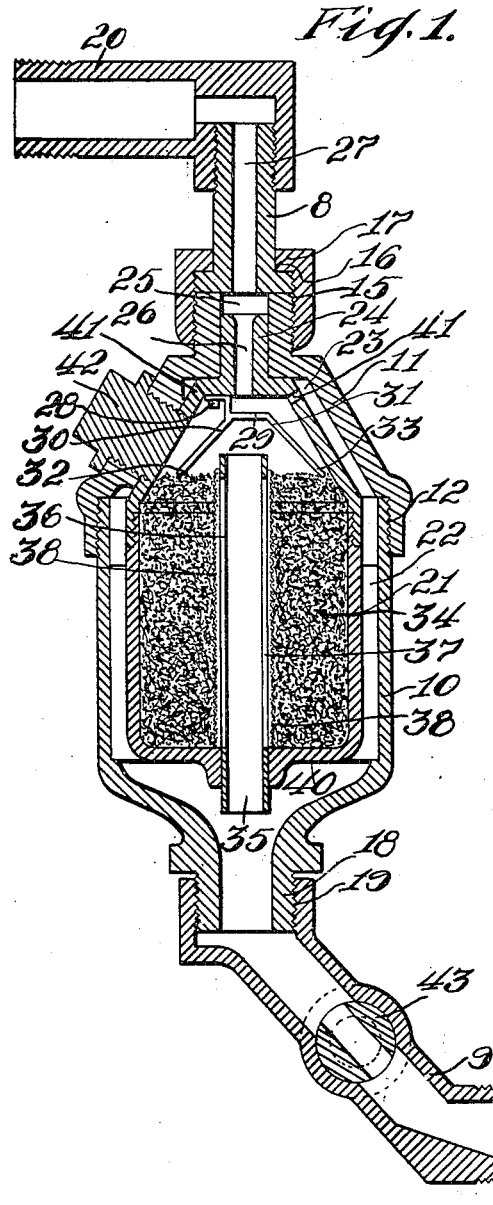
Figure 2:
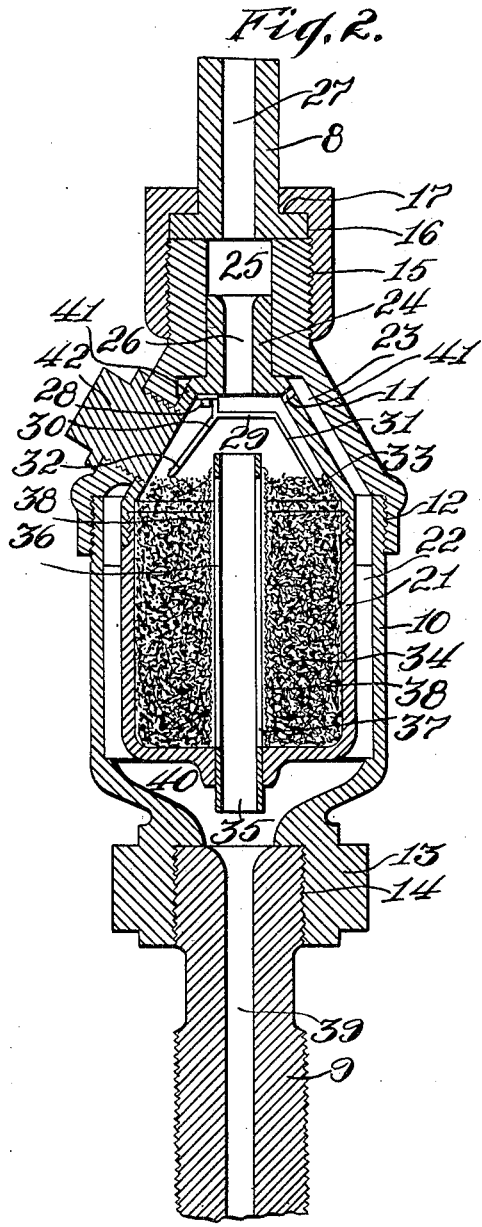

In the accompanying drawings, representing embodiments of the present invention, Figure 1 is a vertical section of one form of lubricating device. Fig. 2 illustrates a view similar to Fig. 1 and defines a construction especially adaptable for connection with a lubricating-conduit leading from the cab of a locomotive to the driving-cylinder thereof. Figs. 3, 4, 5, 6, and 7, respectively, define constructions involving the employment of a lubricant-containing receptacle which is so constructed and arranged as to facilitate the lubricating function of the devices.

In the several illustrations similar characters of reference indicate similar parts.

In Figs. 1 and 2 the lubricating device is located in a lubricant-feed conduit whose portion 8 is directed from a source of supply, while the portion 9 extends to the parts to be lubricated. An application of this device may be in connection with a locomotive, and the portion 8 may lead from the cab of the locomotive, while the portion 9 may extend to a cylinder thereof. The lubricating device comprehends in a general way a casing 10, which may be provided with a cap or cover 11, which may be screw-threaded, as at 12, to the casing 10, and said casing and cap, respectively, may be provided with means for uniting the same to the portions 8 and 9, said means in the present instance comprehending an internally-screw-threaded nut 13, which is carried by the casing 10 and may take onto a screw-threaded portion 14 of the conduit portion 9, while the cap 11 may be provided with an externally-screw-threaded neck 15, which may receive a union-nut 16, which takes over a flanged portion 17 of the conduit portion 8. This is the connection illustrated in Fig. 2. In the illustration Fig. 1 the connection is similar, with the exception that the casing 10 may be provided with a screw-threaded neck 18, which may be inserted into a screw-threaded portion 19 of the conduit portion 9, and in this case also the conduit portion 8 may be directed into a feed-pipe 20. Located in the casing 10 is a cup 21, which is centrally disposed within said casing and in that position supported by radially-disposed ribs 22, which may be either integral with the casing 10 or the cup 21. This cup is provided with a closure 23, corresponding in contour in the present instance with the closure 11, and is provided with a neck 24, which in the present instance is directed into the bore 25 of the neck 15, and said neck 24 is also provided with a bore 26, which preferably corresponds in caliber with the bore 27 of the conduit 8. Beneath the bore 26 of the cup 21 and secured in any suitable manner to the interior wall of the cup—for instance, as by a bolt or screw 28—is a deflector comprehending in the present instance a plate 29, from which may extend two legs 30 and 31, respectively, whose extremities 32 and 33 may either project into or to the surface of a non-liquid lubricant 34—such, for instance, as graphite or any other compound—which may be supplied to the parts to be lubricated by the assistance of a fluid which will disintegrate said mass of non-liquid lubricant by a process of erosion. The combination more particularly adapted for successful lubrication may be graphite, which may be disintegrated by oil, or soft soap, which may be disintegrated by water, or a combination of soft soap and graphite, which may be disintegrated by water. Centrally disposed and preferably perpendicular within the cup 21 is a tube 35, which may be slotted, as at 36 and 37, and which may be covered with a screen or gauze 38, and this tube extends beyond the bottom of the cup 21 in proximity with the mouth 39 of the conduit portion 9. The mouth of this tube, as well as the mouth 39 of the portion 9 of the conduit, may be so formed and their dimensions may be such as will produce best results. The space 40, which surrounds the cup 21 in the casing 10 and with which communication may be had into the cup through openings 41 in the cap portion of said cup, serves to not only keep the cup at a fluid temperature, so as to lessen the liability of condensation within the cup, but also creates an equalization of fluid-pressure on either side of the device—that is, the pressure in the portions 8 and 9. For the purpose of access to the cup 21 there may be provided a plug 42, which may be screw-threaded into the cap portion 11 of the casing 10 and the cap portion of the cup 21. If it should be found that the back pressure from the conduit portion 9 should exceed that coming from the conduit portion 8, there may be provided, as seen in Fig. 1, a valve 43, which may be regulated to meet varying requirements. In this form of device the lubricating fluid may be directed through the conduit portion 8 under pressure, as is usually done in locomotive work, and the fluid will be deposited on the plate 29 of the deflector, when it will run in either direction over the legs 30 and 31 of said deflector and drip onto the mass contained in the cup 21. If graphite be used in the cup and oil be the fluid which is employed, the oil runs upon the surface of the graphite and spreads over the latter, and when it reaches the wire-gauze 38 of the tube 35 it will trickle through said gauze and run down said tube, where it will drop into the mouth 39 of the conduit 9 and then pass to the parts to be lubricated, it being understood that as the oil spreads over the surface of the graphite it will carry a portion of the graphite with it by a process of erosion and that therefore each drop of oil will carry with it a portion or deposit of the graphite, whereby that lubricant which passes through the conduit 9 will be a composition of graphite and oil.

Extending the description to the illustrations set upon Sheet 2 in Figs. 3, 4, 5, 6, and 7, devices are illustrated which are applicable to various uses, and in these illustrations there is disclosed a form of non-liquid-lubricant-containing cup which is both novel and efficient in its construction, and this cup may be secured to various portions of machine elements and may be provided with suitable means variable in form for receiving a fluid lubricant to be directed into the cup.

In Figs. 3, 4, 5, and 6 there is shown as suitably located within a receptacle 43 a member which in the present instance comprises two portions 44 and 45, which are located in a plane oblique to the vertical axis of such receptacle, and alongside of the portion 44 of such obliquely-disposed member is an open-mesh member 46, forming, with the portion 44, a conduit whose lower end is fitted to an outlet or opening 48 in the bottom of the cup. The portion 45 of the obliquely-disposed member serves as a deflecting-surface, upon which is deposited the fluid emanating from fluid-receptacles, which will be later on set forth in connection with the various figures. By such construction the precipitating fluid will find its way to the deflecting portion 45, from whence it will be directed across the surface of non-liquid lubricant 47, and the same will ultimately find its way to the network 46, whereupon it will trickle down and along the same and discharge to the opening 48 of a nipple 49, with which opening the wire-cloth communicates. The cups illustrated in Figs. 3 and 4, respectively, are provided with caps 50, which may be screw-threaded thereupon, as at 51. In Fig. 3 a receptacle 52 is screw-threaded into an opening in said cap 50 and is provided with a frame 53, provided with a depressed portion 54, and said portion 53 may be covered with a fabric 55, suitable for absorbing or wiping a fluid from a member or nipple of a cup, (not shown,) it being understood that these constructions will probably be employed in connection with movable parts which must be lubricated. The cup portion 56, as seen in Fig. 4, and which is provided with a nipple 57, adapted to be screw-threaded into the cap 50, comprises an elongated body which may be used in connection with the cup when the same is carried by a reciprocating element. As seen in Fig. 5, the fluid-receiving chamber 58 is provided in its bottom with an opening 59, which is in communication with the cup 43, and this fluid-receiving chamber is screw-threaded, as at 60, to the body of the cup 43. In Fig. 6 there is illustrated another construction, which may be used in connection with various parts, such as small journals, &c. This construction discloses a reservoir 61, which is screw-threaded onto the body of the cup 43, and this reservoir may be provided with a cap 62, which may be screw-threaded, as at 63, onto the body of the reservoir 61. This reservoir is provided with a centrally-located tube 64, which may be promiscuously provided with perforations 65, through which the fluid 66 may flow down to a mouthpiece 67, where drop 68 may be expelled onto the surface of the deflecting portion 45 of the deflector within the cup 43. A needle-valve 69 is provided for regulating the opening 67, and this may be actuated by a thumb-piece 70, which may be screw-threaded into the cap 62, and also by a spring 71, which surrounds a spindle portion 72 of the valve, said spring and spindle portion being both located within the tube 64.

In the illustrations set forth in Fig. 7 a cap 73 is screw-threaded onto the body 43 and is provided with a plug 74 and a conduit 75. The fluid passes through the conduit 75 and reaches the surface of the graphite, whereupon it will flow to a gauze or wire cloth 76, which is carried by an obliquely-disposed member 77, located within the cup 43, and will thereafter pass through the opening 48 in the nipple 49.

It will now be observed that I have provided lubricating devices for discharging a lubricant and combining it with another lubricant by an intermittent process and whereby the two lubricants are directed to the place to be lubricated in a compound or mixed condition.

It will be noted that the introduction of oil into the graphite is not essential, it being understood that the graphite alone, being a lubricant, may be carried to the parts to be lubricated by such other suitable medium as may be selected.

Having thus described this invention, I claim—

1. In a lubricator, a receptacle for a lubricant provided with an outlet, and a conduit member fitted to the outlet and projecting upward into the receptacle, the conduit member being provided with a gauze portion arranged to be penetrated by a liquid deposited on the surface of the lubricant contained in the receptacle, whereby the liquid will have exit through the conduit to the outlet.

2. In a lubricator, the combination of a receptacle for a lubricant provided with an outlet, means to receive and direct a fluid to the receptacle, a conduit member fitted to the outlet and projecting upward through the receptacle, the conduit being provided with a gauze member arranged to be penetrated by the liquid deposited on the surface of the lubricant contained in the receptacle, whereby the liquid will have exit through the conduit to the outlet.

3. In a lubricator, a receptacle for a lubricant provided with an outlet, and a conduit member fitted to the outlet and projecting upward into the receptacle, the conduit member being provided with a gauze portion arranged to be penetrated by a liquid deposited on the surface of the lubricant contained in the receptacle whereby the liquid will have exit through the conduit to the outlet, the conduit member being provided with an arm at its upper extremity extending transversely across the receptacle to deflect a fluid deposited thereon.

4. In a lubricator, a receptacle for a lubricant provided with an outlet, and a conduit member fitted to the outlet and projecting upward into the receptacle, the conduit member being provided with a gauze portion arranged to be penetrated by a liquid deposited on the surface of the lubricant contained in the receptacle whereby the liquid will have exit through the conduit to the outlet, the conduit member being provided with an integral arm extending transversely across the receptacle and inclined downward toward its free extremity.

5. In a lubricator, the combination of a receptacle for a lubricant provided with an outlet, a conduit member fitted to said outlet and projecting upward into the receptacle, the conduit member being provided with a gauze portion along one side throughout its length.

6. In a lubricator, the combination of a receptacle for a lubricant provided with an outlet, a conduit fitted to such outlet and projecting upward through the receptacle and inclined away from the vertical axis of the receptacle, the conduit being provided with a gauze portion along the side nearest the inner wall of the receptacle.

7. In a lubricator, the combination of a receptacle for a lubricant provided with an outlet, a conduit fitted to such outlet and projecting upward through the receptacle and inclined away from the vertical axis of the receptacle, the conduit being provided with a gauze portion along the side nearest the inner wall of the receptacle, the conduit member being provided with an integral arm extending across the axis of the receptacle and inclined slightly downward toward its free extremity.

Signed at Nos. 9 to 15 Murray street, New York city, this 4th day of August, 1905.

CHESTER COMSTOCK.

Witnesses:
   Francis E. Boyce,
   John O. Seifert.